United States Patent
Yoshikawa et al.

(10) Patent No.: US 11,740,151 B2
(45) Date of Patent: Aug. 29, 2023

(54) ADJUSTABLE SELF-HEATING DIAPHRAGM VACUUM GAUGE

(71) Applicant: AZBIL CORPORATION, Tokyo (JP)

(72) Inventors: Yasuhide Yoshikawa, Chiyoda-ku (JP); Keisuke Obara, Chiyoda-ku (JP); Jun Ichihara, Chiyoda-ku (JP); Kimihiro Sato, Chiyoda-ku (JP)

(73) Assignee: AZBIL CORPORATION, Tokyo (JP)

(*) Notice: Subject to any disclaimer, the term of this patent is extended or adjusted under 35 U.S.C. 154(b) by 0 days.

(21) Appl. No.: 17/739,594

(22) Filed: May 9, 2022

(65) Prior Publication Data

US 2022/0357227 A1    Nov. 10, 2022

(30) Foreign Application Priority Data

May 10, 2021    (JP) .................................. 2021-079519

(51) Int. Cl.
*G01L 9/00*    (2006.01)
*G01L 19/06*    (2006.01)

(52) U.S. Cl.
CPC ............ *G01L 19/06* (2013.01); *G01L 9/0041* (2013.01); *G01L 9/0072* (2013.01)

(58) Field of Classification Search
None
See application file for complete search history.

(56) References Cited

U.S. PATENT DOCUMENTS

| | | | | |
|---|---|---|---|---|
| 8,413,517 B2* | 4/2013 | Janarthanam | ....... | G01L 19/0038 73/118.01 |
| 11,054,329 B2* | 7/2021 | MacNeil | ............... | G01L 27/002 |
| 11,486,785 B2* | 11/2022 | Gilkison | ............. | G01L 19/0654 |
| 2006/0219020 A1* | 10/2006 | Silverbrook | ............ | G01L 9/125 73/729.2 |
| 2009/0158854 A1* | 6/2009 | Silverbrook | ........ | B60C 23/0408 73/724 |
| 2019/0086284 A1* | 3/2019 | Macneil | .................. | G01L 9/025 |

FOREIGN PATENT DOCUMENTS

| | | |
|---|---|---|
| JP | 2009-243887 A | 10/2009 |
| JP | 2010-117154 A | 5/2010 |
| JP | 2019-007906 A | 1/2019 |
| JP | 2019-100766 A | 6/2019 |

* cited by examiner

*Primary Examiner* — David Z Huang
*Assistant Examiner* — Nigel H Plumb
(74) *Attorney, Agent, or Firm* — Oblon, McClelland, Maier & Neustadt, L.L.P.

(57) ABSTRACT

An improved diaphragm vacuum gauge includes a pressure receiving unit having an electrical property that changes in accordance with displacement of a diaphragm caused by pressure of a measurement target medium; a heater that heats the pressure receiving unit; a temperature sensor that measures a temperature of the pressure receiving unit; a pressure measurement unit that converts a change in the electrical property of the pressure receiving unit to a pressure measurement value; a storage unit that stores a plurality of heating temperature settings; a heating temperature setting unit that selects one heating temperature setting from among the plurality of heating temperature settings in accordance with a digital input signal that is externally input; and a controller that controls power supply to the heater based on the temperature measured by the temperature sensor and the heating temperature setting selected by the heating temperature setting unit.

3 Claims, 3 Drawing Sheets

ADJUSTABLE SELF-HEATING DIAPHRAGM VACUUM GAUGE

CROSS-REFERENCE TO RELATED APPLICATIONS

The present application is based on and claims priority to Japanese Application No. 2021-079519, filed May 10, 2021, the entire contents of which are incorporated herein by reference.

BACKGROUND DISCLOSURE

1. Field of the Disclosure

The present disclosure relates to a diaphragm vacuum gauge.

2. Description of the Related Art

Diaphragm vacuum gauges are used in pressure measurement in process chambers for semiconductors. A process gas for semiconductors may be liquefied or solidified when the temperature is not appropriate, adhere to a sensor unit of the diaphragm vacuum gauge, and affect measurement. Therefore, diaphragm vacuum gauges have a self-heating function for preventing the adherence of a liquefied or solidified process gas (see Japanese Unexamined Patent Application Publication No. 2010-117154, Japanese Unexamined Patent Application Publication No. 2009-243887, and Japanese Unexamined Patent Application Publication No. 2019-7906).

Recent semiconductor processes become sophisticated, and various gases are used in one process. The appropriate self-heating temperature may differ depending on the process gas, and therefore, some diaphragm vacuum gauges, such as those disclosed in Japanese Unexamined Patent Application Publication No. 2009-243887, Japanese Unexamined Patent Application Publication No. 2019-7906, and Japanese Unexamined Patent Application Publication No. 2019-100766, have a function of switching the self-heating temperature. Further, some diaphragm vacuum gauges have a function of turning off the self-heating function when not in use to reduce power consumption.

However, diaphragm vacuum gauges in the related art have shortcomings in that users need to input a heating temperature setting to the diaphragm vacuum gauges through communication or analog input to change the self-heating temperature.

SUMMARY DISCLOSURE

The present disclosure has been made to address the above-described shortcomings and provides a diaphragm vacuum gauge for which a heating temperature setting can be easily switched without input of the heating temperature setting through communication or analog input.

A diaphragm vacuum gauge according to the present disclosure includes: a pressure receiving unit configured to have an electrical property that changes in accordance with displacement of a diaphragm caused by pressure of a measurement target medium; a heater configured to heat the pressure receiving unit; a temperature sensor configured to measure a temperature of the pressure receiving unit; a pressure measurement unit configured to convert a change in the electrical property of the pressure receiving unit to a pressure measurement value; a storage unit configured to store in advance a plurality of heating temperature settings; a heating temperature setting unit configured to select one heating temperature setting from among the plurality of heating temperature settings in accordance with a digital input signal that is externally input; and a control unit configured to control power supply to the heater on the basis of the temperature measured by the temperature sensor and the heating temperature setting selected by the heating temperature setting unit.

According to one example configuration of the present disclosure, the diaphragm vacuum gauge further includes: a change unit configured to change at least one of the plurality of heating temperature settings stored in the storage unit in accordance with a user instruction.

According to one example configuration of the present disclosure, the diaphragm vacuum gauge further includes: a digital input circuit configured to convert the digital input signal that is turned ON or OFF to a voltage and input the voltage to the heating temperature setting unit.

According to the present disclosure, the storage unit and the heating temperature setting unit are provided, and therefore, the user need not input a heating temperature setting through communication or analog input, and the heating temperature setting can be easily switched only with a digital input signal.

DETAILED DESCRIPTION

Principle of the Present Disclosure

The present inventors have conceived of a technique for making a diaphragm vacuum gauge retain in advance a plurality of heating temperature settings as parameters to allow a user to select a heating temperature setting with a digital input (hereinafter referred to as DI) signal. Accordingly, the user need not input a heating temperature setting through communication or analog input, and the heating temperature setting can be switched only with an ON signal or an OFF signal for a simple switch.

Embodiment

Figure 1:
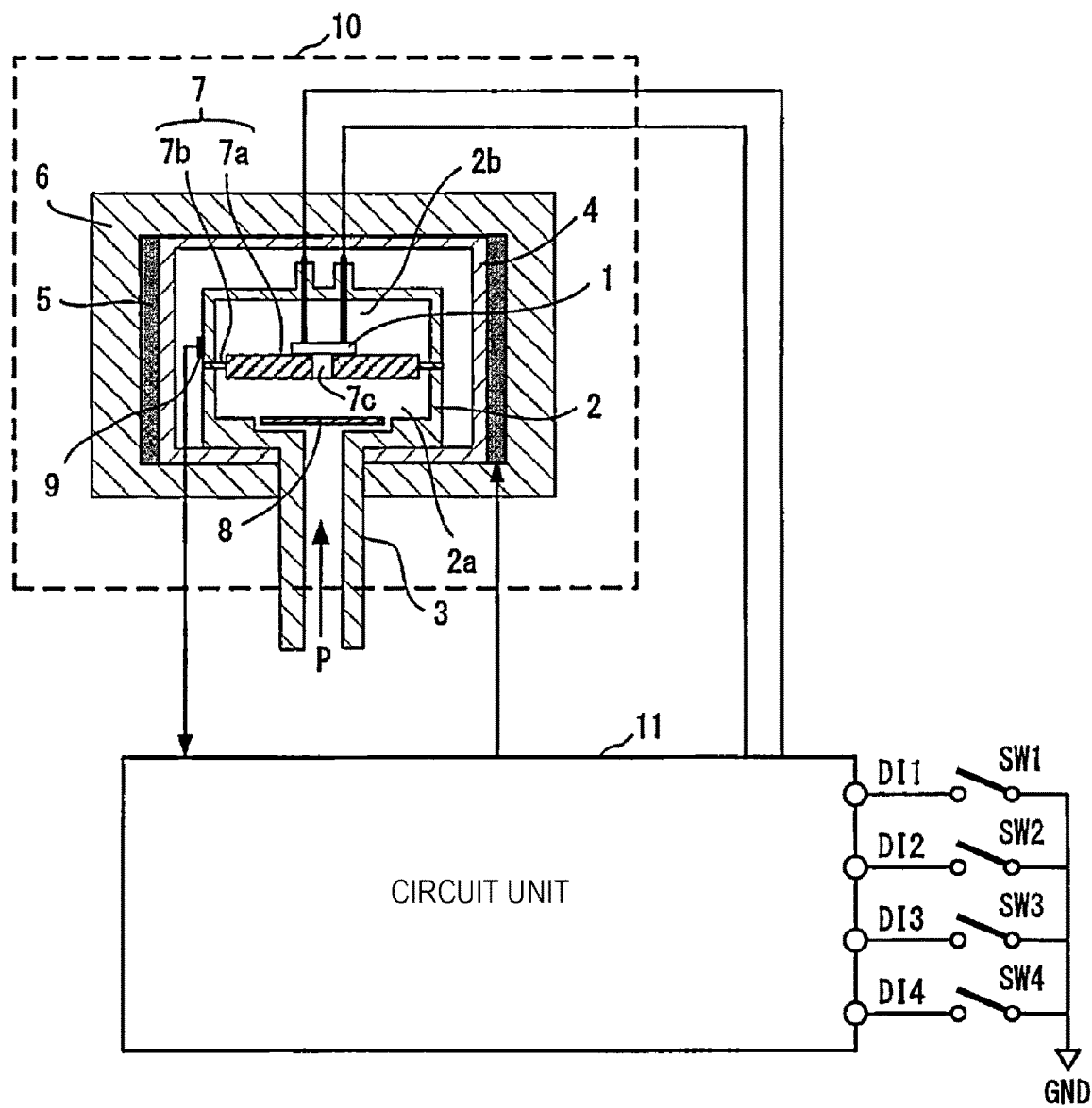
FIG. 1 is a block diagram illustrating a configuration of a diaphragm vacuum gauge according to an embodiment of the present disclosure.
Figure 2:
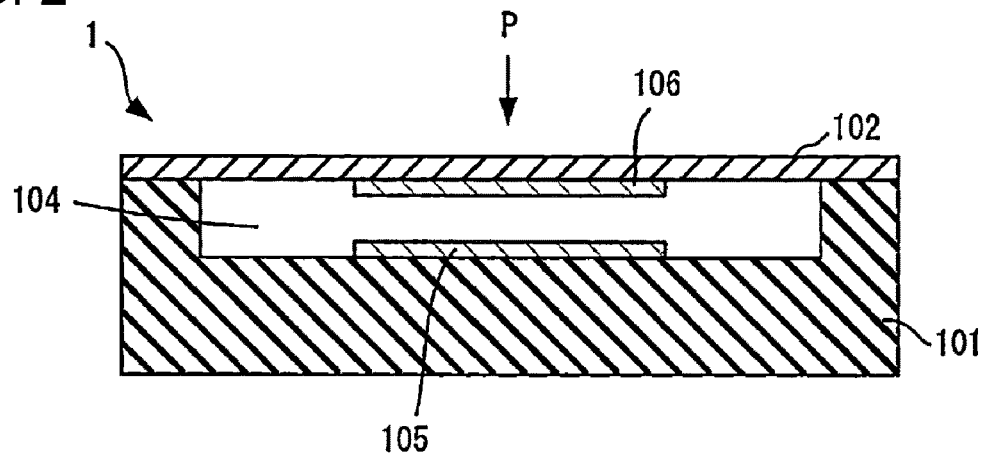
FIG. 2 is a cross-sectional view of a sensor chip of the diaphragm vacuum gauge according to the embodiment of the present disclosure.

Hereinafter, an embodiment of the present disclosure will be described with reference to the drawings. FIG. 1 is a block diagram illustrating a configuration of a diaphragm vacuum gauge according to the embodiment of the present disclosure, and FIG. 2 is a cross-sectional view of a sensor chip included in the diaphragm vacuum gauge.

The diaphragm vacuum gauge includes a pressure receiving unit 10 having a capacitance that changes in accordance with displacement of a diaphragm caused by the pressure of a measurement target medium (for example, a process gas), and a circuit unit 11 that converts the change in the capacitance of the pressure receiving unit 10 to a pressure measurement value.

In a center part of a base 101 of a sensor chip 1 included in the pressure receiving unit 10, an indentation is provided. On a surface of the base 101 on which the indentation is provided, a diaphragm 102 configured to deform in accordance with the pressure P of the measurement target medium is bonded. The indentation of the base 101 forms a reference vacuum chamber 104 together with the diaphragm 102.

In the sensor chip 1, on a surface of the base 101 facing the reference vacuum chamber 104, a fixed electrode 105 is provided, and on a surface of the diaphragm 102 facing the reference vacuum chamber 104, a movable electrode 106 is provided so as to face the fixed electrode 105. Accordingly, the fixed electrode 105 and the movable electrode 106 are disposed so as to face each other with a gap therebetween. When the diaphragm 102 receives the pressure P of the measurement target medium and warps, the distance between the movable electrode 106 and the fixed electrode 105 changes, and the capacitance between the movable electrode 106 and the fixed electrode 105 changes. From this change in the capacitance, the pressure P of the measurement target medium received by the diaphragm 102 can be detected. The diaphragm 102 and the base 101 are formed of an insulator, such as sapphire.

The diaphragm vacuum gauge illustrated in FIG. 1 includes the sensor chip 1 thus configured, a housing 2 that accommodates the sensor chip 1, a pressure transmission pipe 3 through which the pressure P of the measurement target medium is transmitted to the diaphragm 102 of the sensor chip 1, a sensor case 4 that covers the housing 2, and a heater 5 that is provided around the outer circumference surface of the sensor case 4. The sensor case 4 provided with the heater 5 is covered by a heat insulator 6.

Inside the housing 2, a partition 7 is provided. The partition 7 includes a base plate 7a and a support plate 7b and partitions the interior space of the housing 2 into a first space 2a and a second space 2b. The outer circumference of the support plate 7b is fixed to the housing 2, and the support plate 7b supports the base plate 7a so as to be suspended in the interior space of the housing 2. The sensor chip 1 is fixed to a side of the base plate 7a facing the second space 2b. In the base plate 7a, a pressure transmission inlet 7c through which pressure inside the first space 2a is transmitted to the diaphragm 102 of the sensor chip 1 is provided. The second space 2b communicates with the reference vacuum chamber 104 of the sensor chip 1 and is kept under vacuum.

The pressure transmission pipe 3 is connected to the housing 2 on a side facing the first space 2a. Between the pressure transmission pipe 3 and the housing 2, a baffle 8 is provided. The measurement target medium introduced through the pressure transmission pipe 3 comes into contact with a plate surface of the baffle 8 and flows into the first space 2a of the housing 2 through a space around the baffle 8.

On the outer wall surface of the housing 2, a temperature sensor 9 is provided. The temperature sensor 9 measures the temperature of the housing 2 as the temperature of the pressure receiving unit 10.

Figure 3:
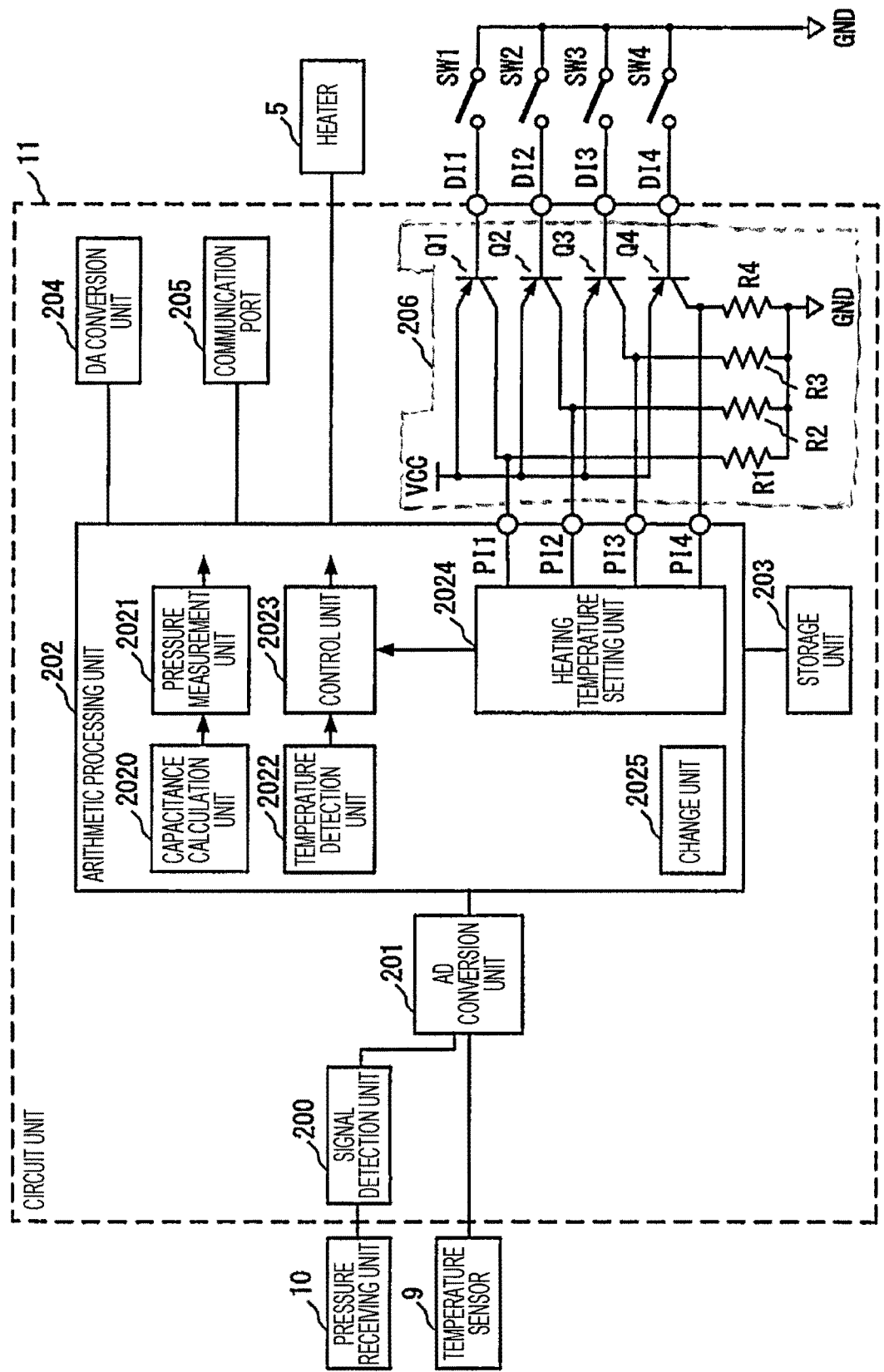
FIG. 3 is a block diagram illustrating a configuration of a circuit unit of the diaphragm vacuum gauge according to the embodiment of the present disclosure.

FIG. 3 is a block diagram illustrating a configuration of the circuit unit 11. The circuit unit 11 includes a signal detection unit 200 that outputs a signal having an amplitude proportional to the capacitance between the movable electrode 106 and the fixed electrode 105, an AD conversion unit 201 that converts an output from the signal detection unit 200 and an output from the temperature sensor 9 to digital signals, an arithmetic processing unit 202, a storage unit 203 that stores a program and data for the arithmetic processing unit 202, a DA conversion unit 204 that converts an output from the arithmetic processing unit 202 to an analog signal, a communication port 205 for external communication, and a digital input circuit 206 that converts a DI signal that is turned ON or OFF to a voltage and inputs the voltage to the arithmetic processing unit 202.

As illustrated in FIG. 3, the arithmetic processing unit 202 includes a capacitance calculation unit 2020 that calculates the capacitance (electrical property) between the movable electrode 106 and the fixed electrode 105 in the pressure receiving unit 10, a pressure measurement unit 2021 that converts a change in the capacitance to a pressure measurement value, a temperature detection unit 2022 that obtains a temperature value measured by the temperature sensor 9, a control unit 2023 that controls power supply to the heater 5 on the basis of the temperature measured by the temperature sensor 9 and a heating temperature setting, a heating temperature setting unit 2024 that selects one from among a plurality of heating temperature settings in accordance with the states of input ports PI1 to PI4, and a change unit 2025 that changes at least one of the plurality of heating temperature settings stored in the storage unit 203 in accordance with a user instruction.

The digital input circuit 206 includes transistors Q1 to Q4 having base terminals to which DI signals DI1 to DI4 are input respectively, emitter terminals to which a power voltage VCC is supplied, and collector terminals that are respectively connected to the input ports PI1 to PI4 of the arithmetic processing unit 202, and resistors R1 to R4 having first ends that are respectively connected to the input ports PI1 to PI4 and second ends that are grounded.

Figure 4:
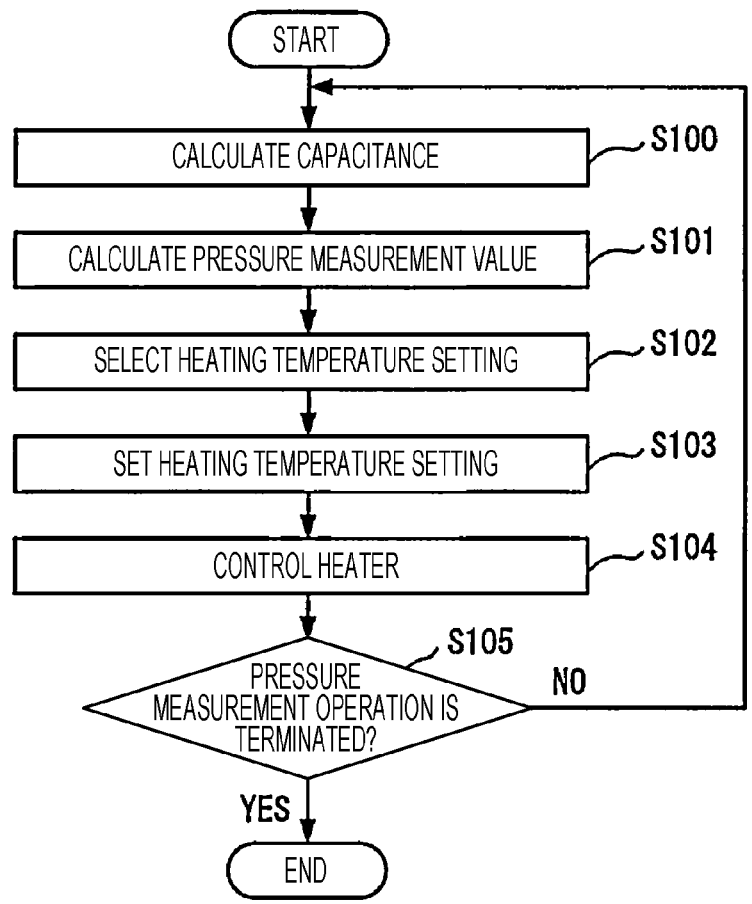
FIG. 4 is a flowchart for explaining operations of an arithmetic processing unit of the diaphragm vacuum gauge according to the embodiment of the present disclosure.

FIG. 4 is a flowchart for explaining operations of the arithmetic processing unit 202. The capacitance calculation unit 2020 calculates the value of the capacitance between the movable electrode 106 and the fixed electrode 105 from the amplitude of an output signal from the signal detection unit 200 (step S100 in FIG. 4).

The pressure measurement unit 2021 converts a change in the capacitance calculated by the capacitance calculation unit 2020 to a pressure measurement value (step S101 in FIG. 4). The pressure measurement value calculated by the pressure measurement unit 2021 is converted to an analog signal by the DA conversion unit 204, and the analog signal is externally output. The pressure measurement value is transmitted to an external device (for example, a computer) via the communication port 205.

In the storage unit 203, a plurality of heating temperature settings are stored in advance. As described above, a user can select one from among these heating temperature settings with the DI signals. Specifically, the user connects, for example, a programmable logic controller (PLC) to digital input terminals of the diaphragm vacuum gauge and uses switches SW1 to SW4 of the PLC to turn ON or OFF the DI signals DI1 to DI4. Table 1 illustrates an example where a heating temperature setting is selected in accordance with the DI signals DI1 to DI4 that are turned ON or OFF.

TABLE 1

| DI1 | DI2 | DI3 | DI4 | Self-heating temperature selection parameter | Heating temperature setting |
|-----|-----|-----|-----|----------------------------------------------|-----------------------------|
| OFF | OFF | OFF | OFF | Parameter 1 | Self-heating OFF |
| OFF | OFF | OFF | ON  | Parameter 2 | 50° C. |

TABLE 1-continued

| DI1 | DI2 | DI3 | DI4 | Self-heating temperature selection parameter | Heating temperature setting |
|---|---|---|---|---|---|
| OFF | OFF | ON | OFF | Parameter 3 | 60° C. |
| OFF | OFF | ON | ON | Parameter 4 | 70° C. |
| OFF | ON | OFF | OFF | Parameter 5 | 80° C. |
| OFF | ON | OFF | ON | Parameter 6 | 90° C. |
| OFF | ON | ON | OFF | Parameter 7 | 100° C. |
| OFF | ON | ON | ON | Parameter 8 | 110° C. |
| ON | OFF | OFF | OFF | Parameter 9 | 120° C. |
| ON | OFF | OFF | ON | Parameter 10 | 130° C. |
| ON | OFF | ON | OFF | Parameter 11 | 140° C. |
| ON | OFF | ON | ON | Parameter 12 | 150° C. |
| ON | ON | OFF | OFF | Parameter 13 | 160° C. |
| ON | ON | OFF | ON | Parameter 14 | 170° C. |
| ON | ON | ON | OFF | Parameter 15 | 180° C. |
| ON | ON | ON | ON | Parameter 16 | 200° C. |

In the example illustrated in Table 1, one heating temperature setting can be selected from among 16 heating temperature settings corresponding to parameter 1 to parameter 16 in accordance with the four DI signals DI1 to DI4 that are turned ON or OFF.

For example, when all of the switches SW1 to SW4 are turned OFF to thereby turn OFF all of the DI signals DI1 to DI4, the transistors Q1 to Q4 in the digital input circuit 206 are turned OFF, and the voltages at the input ports PI1 to PI4 of the arithmetic processing unit 202 become Low.

The heating temperature setting unit 2024 monitors the states of the input ports PI1 to PI4, and selects and reads from the storage unit 203 a heating temperature setting (self-heating temperature selection parameter) corresponding to the states of the input ports PI1 to PI4 (step S102 in FIG. 4). The heating temperature setting unit 2024 sets the read heating temperature setting for the control unit 2023 (step S103 in FIG. 4).

The temperature detection unit 2022 obtains a temperature value measured by the temperature sensor 9. The control unit 2023 controls power supply to the heater 5 such that the temperature measured by the temperature sensor 9 becomes equal to the heating temperature setting (step S104 in FIG. 4).

For example, in a state where all of the DI signals DI1 to DI4 are turned OFF (the voltages at the input ports PI1 to PI4 are Low) as in the above-described example, the heating temperature setting unit 2024 reads parameter 1 from the storage unit 203. In the example illustrated in Table 1, parameter 1 indicates self-heating OFF, and therefore, the control unit 2023 does not allow power supply to the heater 5.

When the switches SW1 to SW3 are turned OFF and the switch SW4 is turned ON to thereby turn OFF the DI signals DI1 to DI3 and turn ON the DI signal DI4, the transistors Q1 to Q3 are turned OFF and the transistor Q4 is turned ON, and the voltages at the input ports PI1 to PI3 become Low and the voltage at the input port PI4 becomes High. In this case, the heating temperature setting unit 2024 reads parameter 2 from the storage unit 203. In the example illustrated in Table 1, parameter 2 indicates 50° C., and therefore, the control unit 2023 allows power supply to the heater 5 such that the temperature measured by the temperature sensor 9 becomes equal to 50° C.

The arithmetic processing unit 202 performs the process in step S100 to step S104 for each measurement cycle until the pressure measurement operation is terminated, for example, in accordance with a user instruction (YES in step S105 in FIG. 4).

Note that the heating temperature settings (self-heating temperature selection parameters) stored in the storage unit 203 can be changed by the user through communication via the communication port 205 or using a digital setting device. The change unit 2025 changes at least one of the plurality of heating temperature settings stored in the storage unit 203 in accordance with a user instruction. Accordingly, for example, parameter 16 can be changed from 200° C. to 190° C.

As described above, in the present embodiment, the heating temperature setting can be easily switched only with the DI signals, and therefore, setting through communication or with an analog signal is not necessary, and the load of the device can be reduced. In the present embodiment, the heating temperature setting can be switched by using, for example, the PLC connected to the digital input terminals, and therefore, the heating temperature setting can be easily changed during, for example, a semiconductor process by using a program of the PLC.

For diaphragm vacuum gauges in the related art, users need to input a heating temperature setting to the diaphragm vacuum gauges through communication or analog input. However, when the heating temperature setting is changed through communication or analog input, an unexpected value may be accidentally set.

In contrast, in the present embodiment, selection is made from among the heating temperature settings stored in advance in the storage unit 203, and therefore, an unexpected value is not set.

Although four DI signals, namely, DI1 to DI4, are used in the present embodiment, the number of DI signals may be one. When the number of DI signals is one, the number of selectable heating temperature settings is two.

Although a capacitance diaphragm vacuum gauge having a capacitance that changes in accordance with displacement of the diaphragm has been described in the present embodiment, the present disclosure is not limited to this and may be applied to other types of diaphragm vacuum gauges. Examples of the other types of diaphragm vacuum gauges include a piezoresistive diaphragm vacuum gauge that includes, for example, a diffused resistor formed of semiconductor silicon as a diaphragm and converts a change in the resistance of the resistor in accordance with displacement of the diaphragm to a pressure measurement value.

Figure 5:
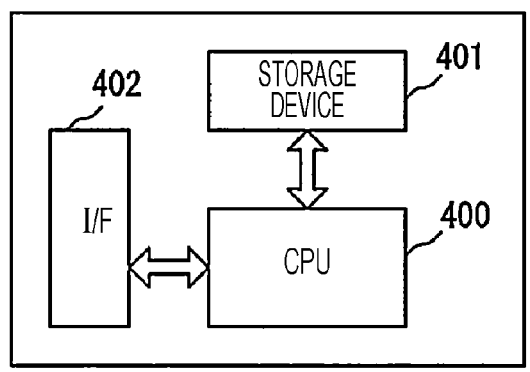
FIG. 5 is a block diagram illustrating an example configuration of a computer that constitutes the arithmetic processing unit of the diaphragm vacuum gauge according to the embodiment of the present disclosure.

The arithmetic processing unit 202 described in the present embodiment can be implemented as a computer that includes a central processing unit (CPU), a storage device, and an interface, and a program that controls these hardware resources. FIG. 5 illustrates an example configuration of this computer.

The computer includes a CPU 400, a storage device 401, and an interface device (I/F) 402. To the I/F 402, for example, the heater 5, the AD conversion unit 201, the DA conversion unit 204, and the communication port 205 are connected. In the computer thus configured, a program for implementing the method of the present disclosure is stored in the storage device 401. The CPU 400 performs the process described in the present embodiment in accordance with the program stored in the storage device 401.

The present disclosure is applicable to diaphragm vacuum gauges.

What is claimed is:
1. A diaphragm vacuum gauge comprising:
   a pressure receiving unit configured to have an electrical property that changes in accordance with displacement of a diaphragm caused by pressure of a measurement target medium;

a heater configured to heat the pressure receiving unit;
a temperature sensor configured to measure a temperature of the pressure receiving unit;
a pressure measurement unit configured to convert a change in the electrical property of the pressure receiving unit to a pressure measurement value;
a storage unit configured to store in advance a plurality of heating temperature settings;
a heating temperature setting unit configured to select one heating temperature setting from among the plurality of heating temperature settings in accordance with a digital input signal that is externally input; and
a control unit configured to control power supply to the heater on the basis of the temperature measured by the temperature sensor and the heating temperature setting selected by the heating temperature setting unit.

2. The diaphragm vacuum gauge according to claim 1, further comprising:
a change unit configured to change at least one of the plurality of heating temperature settings stored in the storage unit in accordance with a user instruction.

3. The diaphragm vacuum gauge according to claim 1, further comprising:
a digital input circuit configured to receive the digital input signal, convert the digital input signal to a voltage, and input the voltage to the heating temperature setting unit.

* * * * *